(12) United States Patent
Yamaguchi

(10) Patent No.: US 6,926,300 B2
(45) Date of Patent: Aug. 9, 2005

(54) ATTACHMENT FOR TOWING VEHICLE

(75) Inventor: Kikuo Yamaguchi, Kanagawa (JP)

(73) Assignee: Yamaguchi Wrecker Inc., Yokohama (JP)

( * ) Notice: Subject to any disclaimer, the term of this patent is extended or adjusted under 35 U.S.C. 154(b) by 0 days.

(21) Appl. No.: 10/675,968

(22) Filed: Oct. 2, 2003

(65) Prior Publication Data

US 2004/0108684 A1 Jun. 10, 2004

(30) Foreign Application Priority Data

Dec. 9, 2002 (JP) ........................................ 2002-356457

(51) Int. Cl.7 ................................................. B60D 1/58
(52) U.S. Cl. ........................ 280/457; 414/563; 280/432
(58) Field of Search ................................ 280/432, 477, 280/400, 457; 414/563, 463

(56) References Cited

U.S. PATENT DOCUMENTS

| | | | | |
|---|---|---|---|---|
| 4,473,334 A | * | 9/1984 | Brown | 414/563 |
| 4,859,134 A | * | 8/1989 | Lock | 414/563 |
| 5,628,609 A | * | 5/1997 | Nespor | 414/563 |
| 5,735,410 A | * | 4/1998 | Kallstrom | 211/20 |
| 5,795,115 A | * | 8/1998 | Collins | 410/22 |
| 6,099,012 A | * | 8/2000 | Mortimer | 280/402 |
| 6,315,515 B1 | * | 11/2001 | Young et al. | 414/563 |
| 2003/0123964 A1 | * | 7/2003 | Estes | 414/462 |

* cited by examiner

*Primary Examiner*—Avraham Lerner
(74) *Attorney, Agent, or Firm*—Leydig, Voit & Mayer, Ltd.

(57) ABSTRACT

A vehicle towing attachment inserted into a lower portion of a vehicle to be towed raises and holds wheels when the vehicle to be towed is towed. The attachment has three prongs for retaining a plate spring to which a wheel of the vehicle is attached. Since the three prongs are provided on the attachment, shifting of the towed vehicle in the transverse direction and the front and rear direction can be prevented without fail. Even during the course of a towing operation, the towed vehicle can be retained stably and reliably.

4 Claims, 4 Drawing Sheets

ATTACHMENT FOR TOWING VEHICLE

BACKGROUND OF THE INVENTION

1. Field of the Invention

The invention relates to an attachment to be used for towing a vehicle.

2. Background Art

When a disabled vehicle or a vehicle having undergone an accident is towed with a wrecker, front or rear wheels of the vehicle are raised, and the vehicle is towed with the other wheels rolling freely.

FIG. 5 is a schematic view showing that front wheels of a vehicle 101 to be towed (simply called a "towed vehicle 101"), such as a disabled vehicle or a vehicle having undergone an accident, are raised. As can be seen from the drawing, a T-shaped arm 102 is extended from a wrecker 100 toward the towed vehicle 101, and a lower portion of the towed vehicle 101 is retained with a vehicle towing attachment 103 fixed on the arm 102, thereby raising the front wheels.

FIG. 6 is a schematic representation showing the attachment 103. The attachment 103 is mounted on either end of the T-shaped arm 102. As shown in FIG. 6, the attachment 103 comprises two prongs 103a, 103b; and a recess 103c existing between the prongs 103a, 103b.

FIG. 7 is a side view showing that the towed vehicle 101 is raised with the attachment 103. As shown in FIG. 7, for example, when the towed vehicle 101 is an automobile such as a truck, a center plate spring 104 is provided as a shock absorber for the front wheel 106. A forward fulcrum 104a of the plate spring 104 is supported on a frame 107. The attachment 103 is inserted from below to a position located rearward of the fulcrum 104a. The plate spring 104 is fitted between the prongs 103a, 103b, and the lower portion of the plate spring 104 is supported with the recess 103c, thus raising the front wheel 106.

However, when the towed vehicle 101 is towed by the wrecker 100, relative force acts between the towed vehicle 101 and the attachments 103 for various reasons, such as acceleration/deceleration, a directional change, or a deteriorated state of a road surface. At this time, the conventional attachments 103 shown in FIG. 6 fail to retain the towed vehicle 101 without fail.

Particularly, when force acts in the longitudinal direction of the plate spring 104 between the towed vehicle 101 and the attachments 103, there arises a problem of the attachments 103 sliding in the longitudinal direction of the plate springs 104. In this case, damage is inflicted on the plate springs 104 and the neighborhood thereof. In order to prevent occurrence of such damage, as shown in FIG. 7, the root of the arm 102 and the plate spring 104 must be bound together with a chain 105 while the plate springs 104 are held with the attachments 103. Therefore, very complicated operation is required at the time of towing operation.

The plate springs 104 deflect vertically according to a road condition during towing operation. For this reason, if the chain 105 is bound directly around the plate spring 104, the chain 105 will be bitten at the neighborhood of the fulcrum 104a. As a result, there arises a problem of the chain 105 being disabled or the plate spring 104 being subjected to damage.

SUMMARY OF THE INVENTION

As mentioned above, the invention has been conceived to solve the problem and aims at providing a vehicle to wing attachment which obviates a complicated operation and enables raising and reliable retention of a vehicle to be towed.

According to one aspect of the present invention, a vehicle towing attachment which is to be inserted into a lower portion of a vehicle to be towed and raises and holds wheels when the vehicle is towed. The attachment comprises three prongs for retaining a plate spring having the wheel attached thereon. A plate spring provided at the bottom of a vehicle to be towed is supported in three directions by means of three prongs, thereby retaining the vehicle without fail. The prongs may assume any geometry, such as the shape of a plate, a prismatic shape, or a circular cylindrical shape.

According to another aspect of the present invention, a first prong of the three prongs retains a longitudinal end of the plate spring, and second and third prongs retain sides of the plate spring. The first prong can inhibit shifting of the vehicle in the front and rear direction thereof, and the second and third prongs can inhibit shifting of the vehicle in the transverse direction thereof.

According to another aspect of the present invention, the attachment is constituted by cementing together a first plate having the first prong formed thereon and a second plate having the second and third prongs formed thereon. The attachment is constituted by cementing together plates. Hence, the attachment can be manufactured without use of a special machine or special processes. Various methods, such as welding, fastening with bolts and nuts, or bonding, can be adopted as a cementing method.

Other and further objects, features and advantages of the invention will appear more fully from the following description.

DETAILED DESCRIPTION OF THE PREFERRED EMBODIMENT

Figure 1:
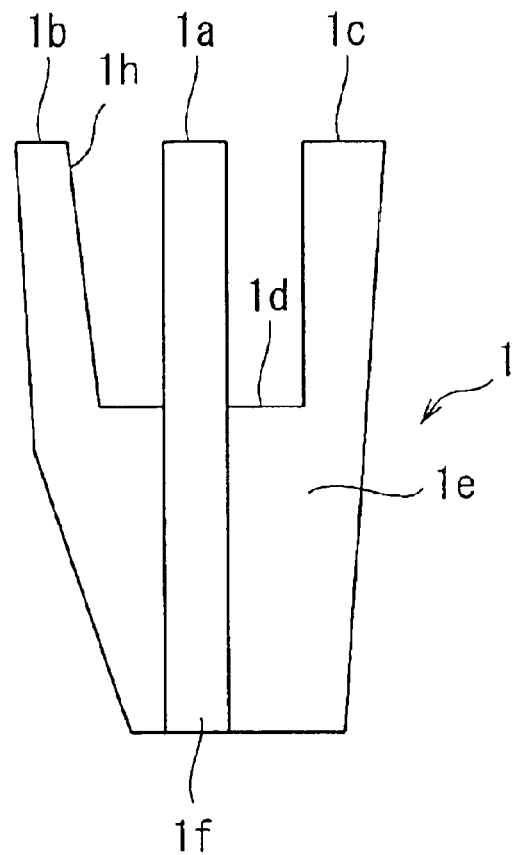
FIG. 1 is a front view of the attachment for towing a vehicle according to an embodiment of the invention.
Figure 2:
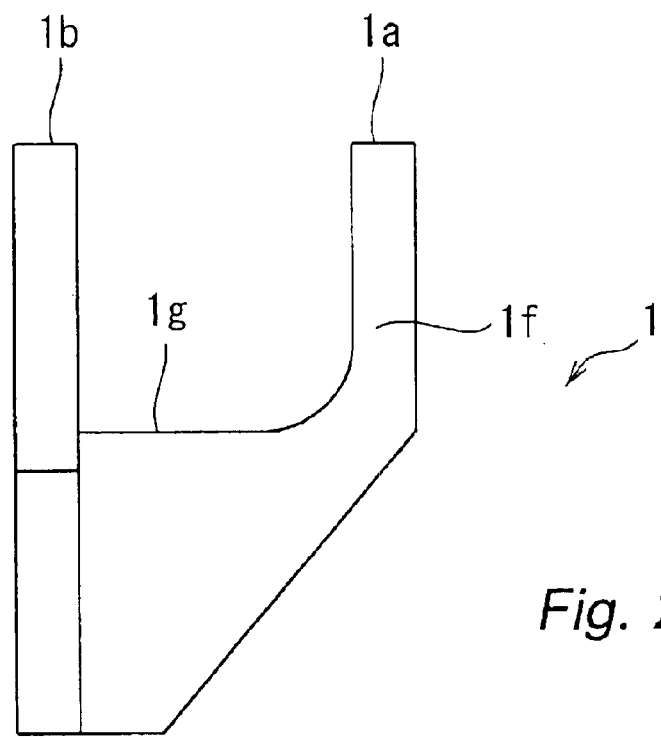
FIG. 2 is a side view of the attachment for towing a vehicle according to an embodiment of the invention.

FIGS. 1 and 2 are schematic representations showing an attachment 1 for towing a vehicle (a vehicle towing member) according to an embodiment of the invention. FIG. 1 is a front view of the attachment 1; and FIG. 2 is a side view of the same. As shown in FIGS. 1 and 2, the attachment 1 has three pronging sections 1a, 1b, and 1c. The attachment 1 is formed by placing a plate 1f, which has a prong 1a, on and normal to a plate 1e having prongs 1b, 1c. A recess 1d exists between the prongs 1b, 1c and is connected to an end face 1g of the plate 1f. Further, the plate 1e has a tapered surface 1h. When the plates 1e, 1f are made of iron, the plates 1e, 1f are preferably joined together by means of welding. Alternatively, the plates 1e, 1f may be bonded together by means of fastening with bolts and nuts. Here, the attachment 1 may be formed integrally by means of a method such as casting.

Figure 3:
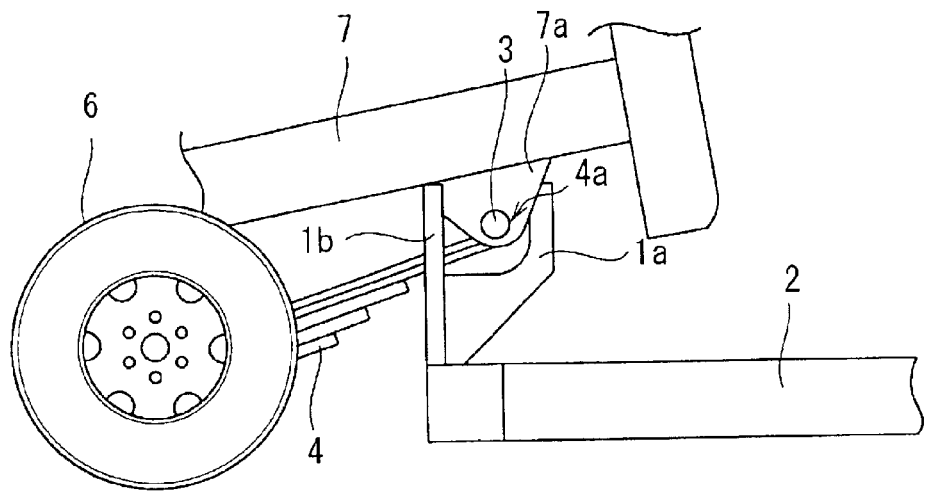
FIG. 3 is a side view showing that front wheels of a vehicle to be towed are held in a raised state with the attachment.
Figure 4:
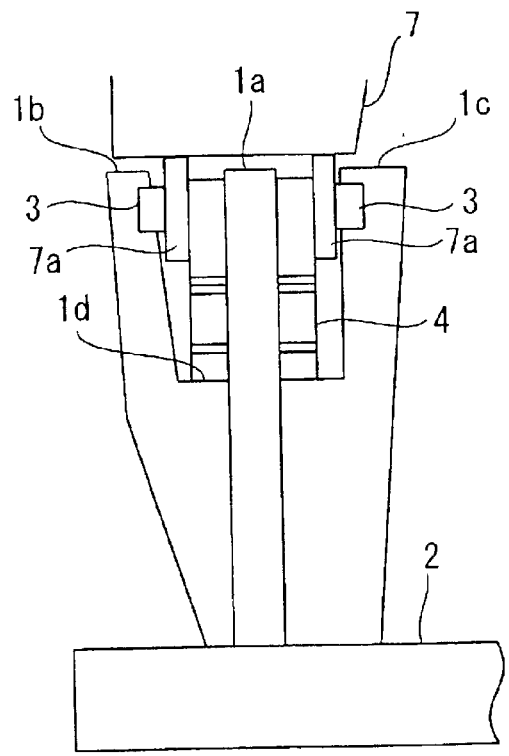
FIG. 4 is a front view obtained when the state shown in FIG. 3 is viewed from a wrecker.

FIG. 3 is a side view showing that front wheels 6 of a vehicle to be towed (i.e., a towed vehicle) are held in a raised state with the attachment 1. FIG. 4 is a front view obtained when the state shown in FIG. 3 is viewed from a wrecker. As shown in FIGS. 3 and 4, a plate spring 4 of the towed vehicle is supported on a frame 7 by means of a shaft 3 passing through a support section 7*a* of the frame 7 at a fulcrum 4*a*.

Figure 5:
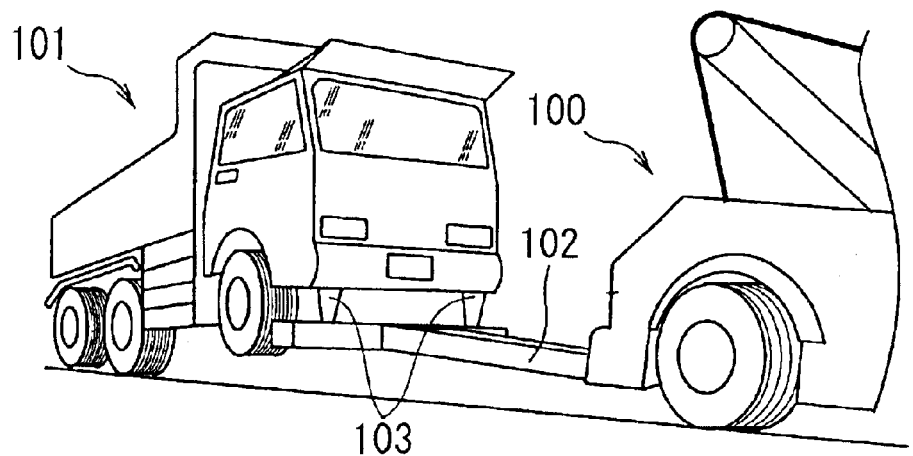
FIG. 5 is a schematic view showing that front wheels of a vehicle to be towed, such as a disabled vehicle or a vehicle having undergone an accident, are raised.
Figure 6:
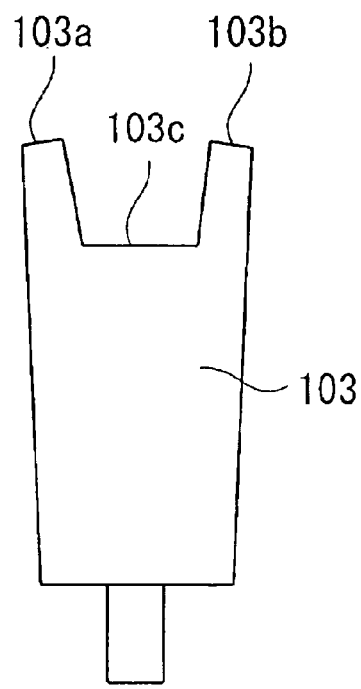
FIG. 6 is a schematic representation showing a conventional attachment.
Figure 7:
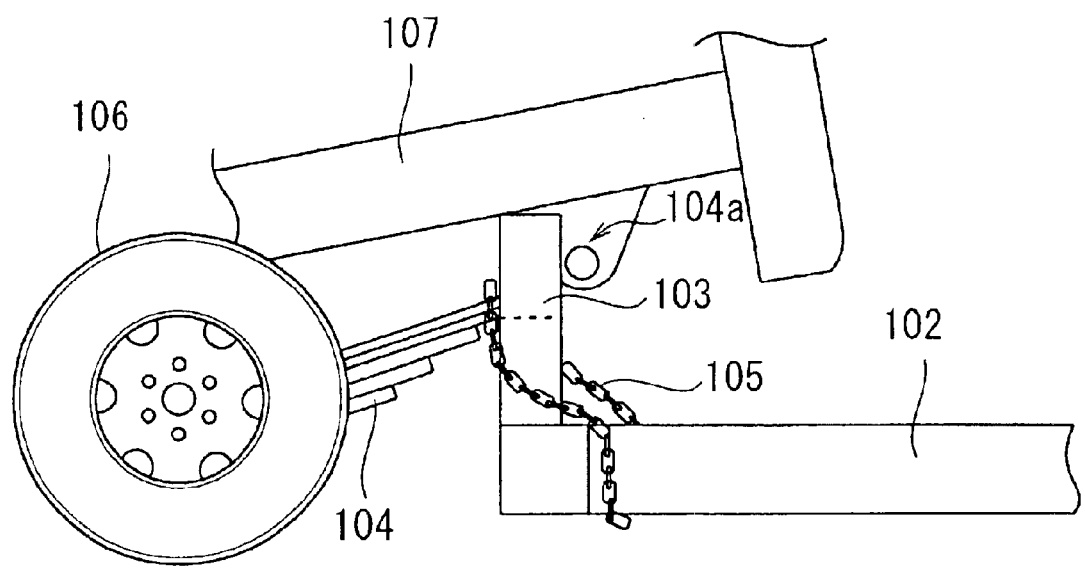
FIG. 7 is a side view showing that the towed vehicle is raised with a conventional attachment.

As in the case of the attachment shown in FIG. 5, the attachment 1 is fixed to an arm 2 of the wrecker. As shown in FIGS. 3 and 4, a lower portion of the plate spring 4 is retained by the recess 1*d* of the attachment 1 from the below, and sides of the plate spring 4 are retained by the prongs 1*b*, 1*c*. As a result, shifting of the plate spring 4 with respect to the attachment 1 in the transverse direction of the vehicle is prevented. The plate sprint 4 can be inserted between the prongs 1*b*, 1*c* without fail by means of the tapered surface 1*h*.

The front end of the plate spring 4 is retained by the prong 1*a*. Accordingly, shifting of the plate spring 4 with respect to the attachment 1 in the front and rear direction of the vehicle, particularly, shifting of the plate spring 4 in the direction that approaches the arm 2, can be prevented without fail. Moreover, as shown in FIG. 4, so long as the interval between the prongs 1*b*, 1*c* is made shorter than the overall length of the shaft 3, when the plate spring 4 has shifted in the direction departing from the arm 2, the prongs 1*b*, 1*c* come into contact with the shaft 3. As a result, the shifting of the plate spring 4 in the direction departing from the arm 2 can be completely prevented. Thus, the interval between the prongs 1*b*, 1*c* is made shorter than the interval between the members projecting from the neighborhood of the plate spring 4 in the horizontal direction of the vehicle. As a result, shifting of the towed vehicle in the direction departing from the arm 2 can be inhibited without fail.

FIGS. 3 and 4 show that the recess 1*d* and the lower surface of the plate springs 4 remain in contact with each other. When the plate spring 4 has a greater width or when the width of the attachment 1 in the transverse direction thereof is desired to be minimized, the plate spring 4 can be sandwiched and retained between the prongs 1*b*, 1*c* by means of the tapered surface 1*h*. In this case, the plate spring 4 can be retained without fail by means of the prongs 1*a*, 1*b*, and 1*c* even when no contact exists between the recess 1*d* and the plate spring 4.

As mentioned above, according to the embodiment, the attachment 1 is equipped with the three prongs 1*a*, 1*b*, and 1*c*. Hence, shifting of the towed vehicle in the transverse direction and the front and rear direction can be prevented without fail. The towed vehicle can be retained stably and reliably even during the course of towing operation. There can be prevented infliction of damage on the towed vehicle or the attachment 1, which would otherwise be caused by relative shifting arising between the plate spring 4 and the attachment 1. When the towed vehicle is retained, only the requirement is to insert the attachment 1 to the lower portion of the fulcrum 4*a* of the plate spring 4. Hence, complicated operations, which would otherwise have to be performed after insertion of the attachment, such as winding of a chain around the attachment, are obviated. As a result, ease of operation required to perform towing operation can be improved significantly.

Since the attachment 1 is formed by cementing (joining) together the two plates 1*e*, 1*f*, the attachment 1 having the three prongs 1*a*, 1*b*, and 1*c* can be manufactured readily and at low cost. So long as requirements for the plates 1*e*, 1*f*, such as material, shape, thickness, and hardening, are adjusted, as required, the attachment 1 possessing desired strength can be manufactured even when the towed vehicle is a large vehicle.

According to the attachment 1 of the embodiment, the three prongs 1*a*, 1*b*, and 1*c* are provided in the form of projections. The planar areas occupied by the three prongs are very small. Hence, even when another member is arranged or fixed in close proximity to the plate spring 4, the attachment 1 can be inserted into the neighborhood of the fulcrum 4*a* without involvement of interference with the other member. Accordingly, even when the engine or other constituent components of the towed vehicle are arranged around the plate spring 4, the spring plate 4 can be retained without fail.

Since the invention is configured in the manner mentioned above, the invention yields the following advantages.

A plate spring is retained in three directions by means of three prongs. Hence, shifting of the towed vehicle can be inhibited without fail. Even during the course of towing operation, the towed vehicle can be retained stably and reliably.

The longitudinal end of the plate spring is retained by a first prong, and sides of the plate spring are retained by second and third prongs. Thus, the shifting of the towed vehicle in the front and rear direction and transverse direction thereof can be inhibited thoroughly.

Since the attachment is constituted by cementing together the first plate having the first prong formed thereon and the second plate having the second and third prongs formed thereon, the attachment can be manufactured readily and inexpensively without use of a special apparatus and processes.

Obviously many modifications and variations of the present invention are possible in the light of the above teachings. It is therefore to be understood that within the scope of the appended claims the invention may by practiced otherwise than as specifically described.

The entire disclosure of a Japanese Patent Application No. 2002-356457, filed on Dec. 9, 2002 including specification, claims, drawings and summary, on which the Convention priority of the present application is based, are incorporated herein by reference in its entirety.

What is claimed is:

1. A vehicle towing attachment for receiving a lower portion of the vehicle to be towed and holding a portion of the vehicle while the vehicle is being towed, the attachment comprising:

a first plate including a first base and first and second spaced apart prongs projecting from the first base, a first opening in the first plate lying between and being defined by the first and second prongs, the first opening for receiving a spring of a vehicle to be towed; and a second plate mounted on and transverse to the first plate, including a second base joined to the first base and a third prong projecting from the second base, opposite and spaced from the first opening in the first plate, the third prong defining a second opening between the third prong and a plane defined by the first and second prongs.

2. The vehicle towing attachment according to claim 1 wherein the first opening is defined by inside surfaces of the first and second prongs that face each other, the first and second surfaces being generally planar but not generally parallel to each other for receiving and retaining the spring of the vehicle to be towed.

3. The vehicle towing attachment according to claim 1 wherein the first base and first and second prongs lie in a first plane and the second base and the third prong lie in a second plane substantially perpendicular to the first plane.

4. The vehicle towing attachment according to claim 2 wherein the first base and first and second prongs lie in a first plane and the second base and the third prong lie in a second plane substantially perpendicular to the first plane.

* * * * *